(12) United States Patent
Curry

(10) Patent No.: US 7,577,302 B2
(45) Date of Patent: Aug. 18, 2009

(54) COMPRESSED IMAGE DATA ENHANCEMENT

(75) Inventor: Donald J. Curry, Menlo Park, CA (US)

(73) Assignee: Xerox Corporation, Norwalk, CT (US)

( * ) Notice: Subject to any disclaimer, the term of this patent is extended or adjusted under 35 U.S.C. 154(b) by 775 days.

(21) Appl. No.: 11/312,458

(22) Filed: Dec. 21, 2005

(65) Prior Publication Data

US 2007/0140570 A1    Jun. 21, 2007

(51) Int. Cl.
  *G06K 9/36* (2006.01)
  *G06K 9/46* (2006.01)
(52) U.S. Cl. .................. 382/233; 382/235; 382/251
(58) Field of Classification Search ................. 382/166, 382/233, 235, 248, 250, 251, 275; 358/464
See application file for complete search history.

(56) References Cited

U.S. PATENT DOCUMENTS

| 6,256,423 B1 * | 7/2001 | Krishnamurthy et al. ..... 382/251 |
| 6,594,386 B1 * | 7/2003 | Golshani et al. ............ 382/166 |

* cited by examiner

*Primary Examiner*—Phuoc Tran
(74) *Attorney, Agent, or Firm*—Oliff & Berridge, PLC

(57) ABSTRACT

An image background remover is disclosed that performs background removal of JPEG (Joint Photographic Experts Group) compressed image data without first performing a complete decompression of the compressed image data.

11 Claims, 6 Drawing Sheets

COMPRESSED IMAGE DATA ENHANCEMENT

BACKGROUND

Image quality is an important factor in electronic image producing devices such as xerographic copiers, printers, etc. Thus, new technology is needed to improve image quality.

SUMMARY

An image background remover is disclosed that performs background removal of JPEG (Joint Photographic Experts Group) compressed image data without first performing a complete decompression of the compressed image data. For image data expressed in $YC_bC_r$ format (YCC) background removal may be achieved by applying a stretch factor (stretching) to DC coefficients of luminance data (Y).

Stretching luminance DC coefficients of compressed image data may be performed as follows:

1. decode a compressed block of luminance data to obtain a block of quantized luminance DCT (discrete cosine transform) coefficient data (luminance coefficient block);

2. multiplying a quantized DC coefficient in the luminance coefficient block by a quantization scale factor (dequantization) to obtain a DC coefficient expressed in signed notation (signed DC coefficient);

3. converting the signed DC coefficient to unsigned notation (unsigned DC coefficient) by adding a fixed bias;

4. multiplying the unsigned DC coefficient by a stretch factor and limiting the product to a target value such as a maximum value to obtain a unsigned-stretched DC coefficient;

5. converting the unsigned-stretched DC coefficient to signed notation by subtracting the fixed bias to obtain a stretched DC coefficient;

6. dividing the stretched DC coefficient by the quantization scale factor and truncating to obtain a quantized-stretched DC coefficient;

7. replacing the quantized DC coefficient in the luminance coefficient block with the quantized-stretched DC coefficient to obtain a modified luminance coefficient block;

8. entropy coding the modified luminance block; and 9. including the modified luminance block in a background removed compressed image data.

All of steps 2-6 can be combined into a single lookup table step. In this way, compressed JPEG image data may be background removed quickly by processing one compressed luminance block at a time and may require only a small amount of memory.

DETAILED DESCRIPTION OF EMBODIMENTS

Figure 1:
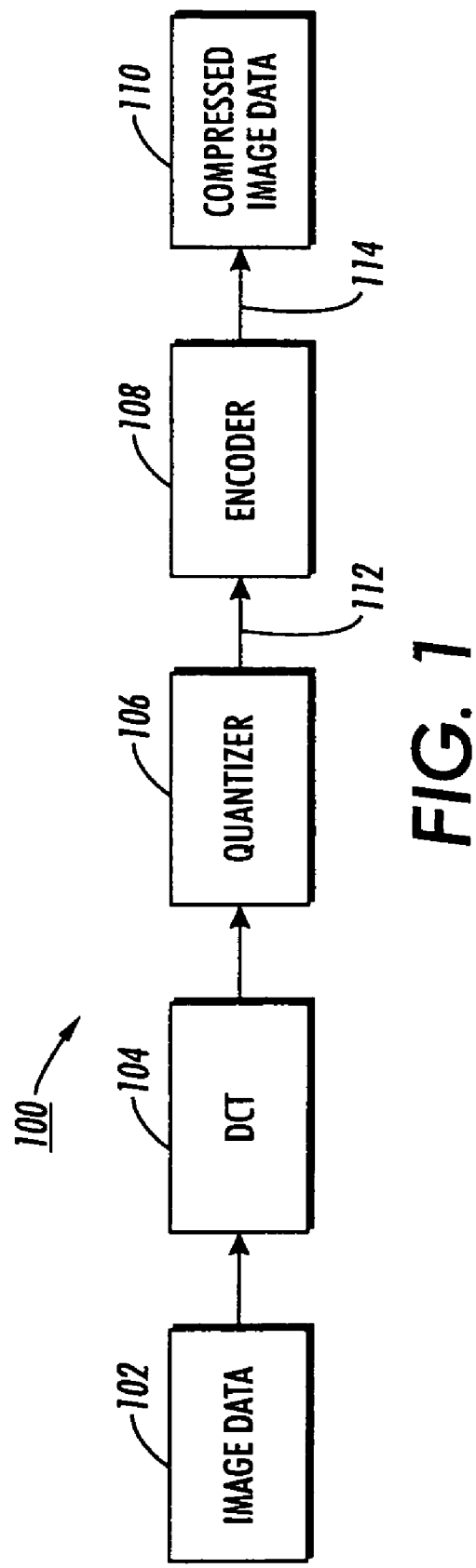
FIG. 1 shows an exemplary JPEG image data compression process.

FIG. 1 shows an exemplary block diagram 100 of a JPEG image data compression process. Image data 102 may be divided into 8×8 blocks, and the 8×8 blocks may be transformed by a DCT 104. DCT 104 converts each of the 8×8 blocks of image data into an output corresponding 8×8 block of coefficients that represent spatial frequency information. The top left corner of the 8×8 block of coefficients is a DC coefficient. A quantizer 106 divides the outputs of DCT 104 by a quantization scale factor. The quantization scale factor may be a power of two so that quantizer 106 may simply right shift the coefficients by an appropriate number of bits, for example. Quantizer 106 may reduce the number of bits of each coefficient by either truncating or rounding fractional portions of the quantized coefficients to obtain integer outputs 112. An encoder 108 may compress outputs 112 by using coding techniques such as predictive, Huffman and/or run-length coding, for example, to generate outputs 114. Outputs 114 of all 8×8 blocks of image data 100 form compressed image data 110. Thus, compressed image data 110 is a collection of variable sized data blocks where each of the data blocks corresponds to one of the 8×8 blocks of the image data 100.

Figure 2:
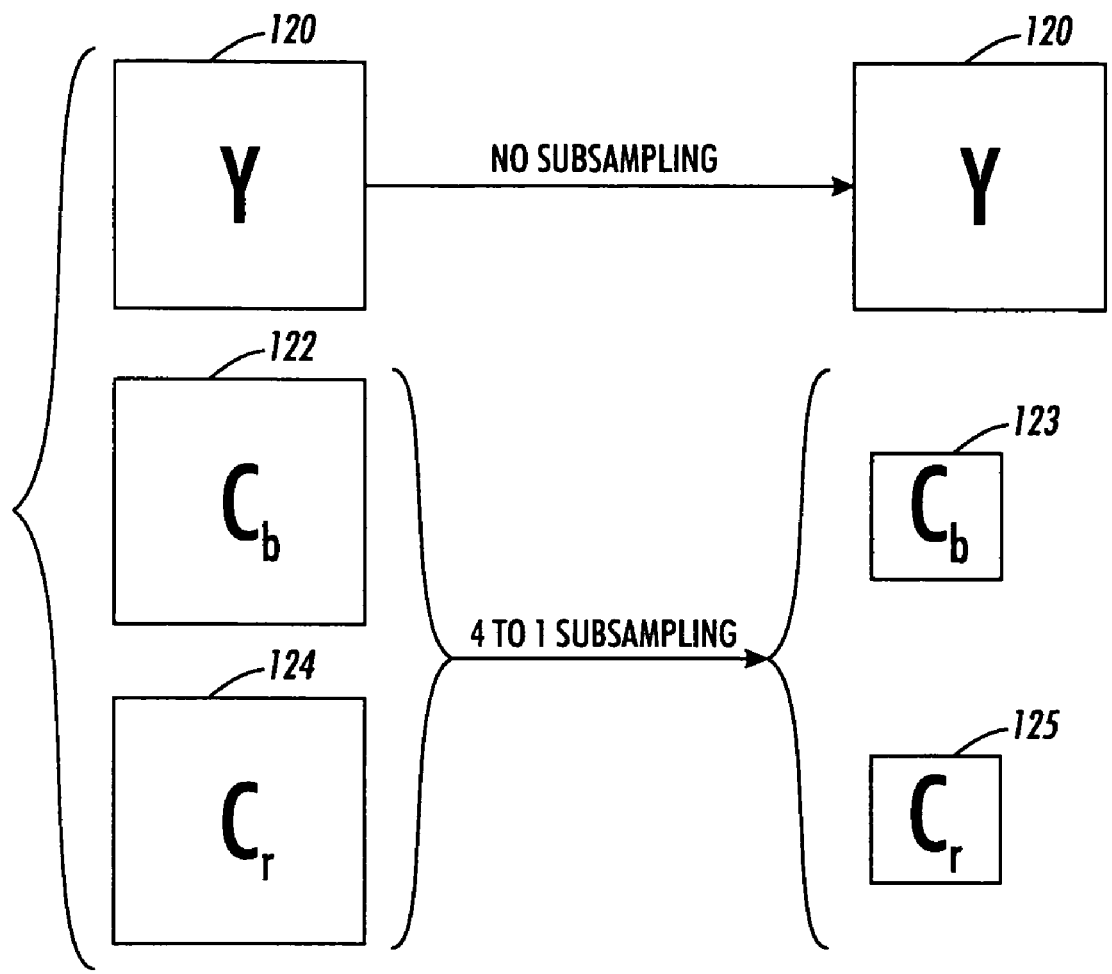
FIG. 2 shows subsampling of color blocks.

For color image data, each pixel of the image data may be expressed in different formats such as $YC_bC_r$ (YCC), or RGB, for example. In the YCC format, the Y represents luminance data while the CC represents chrominance data. Thus, each pixel of the image data may be represented by three values, one value for luminance and two values for chrominance. When performing JPEG image data compression, each of the YCC data may be divided into 8×8 blocks and processed accordingly, as discussed above. However, due to human vision characteristics, the chrominance components may be subsampled to reduce the data volume without compromising perceived image quality. Thus, as shown in FIG. 2, image data represented by chrominance portions 122 and 124 may be subsampled using a 4 to 1 subsampling, for example, to obtain chrominance portions 123 and 125. The chrominance portions 123 and 125 are each one quarter the size of the luminance portion 120. The sizes of the chrominance portions 123 and 125 may vary depending on the subsampling ratio used.

Figure 3:
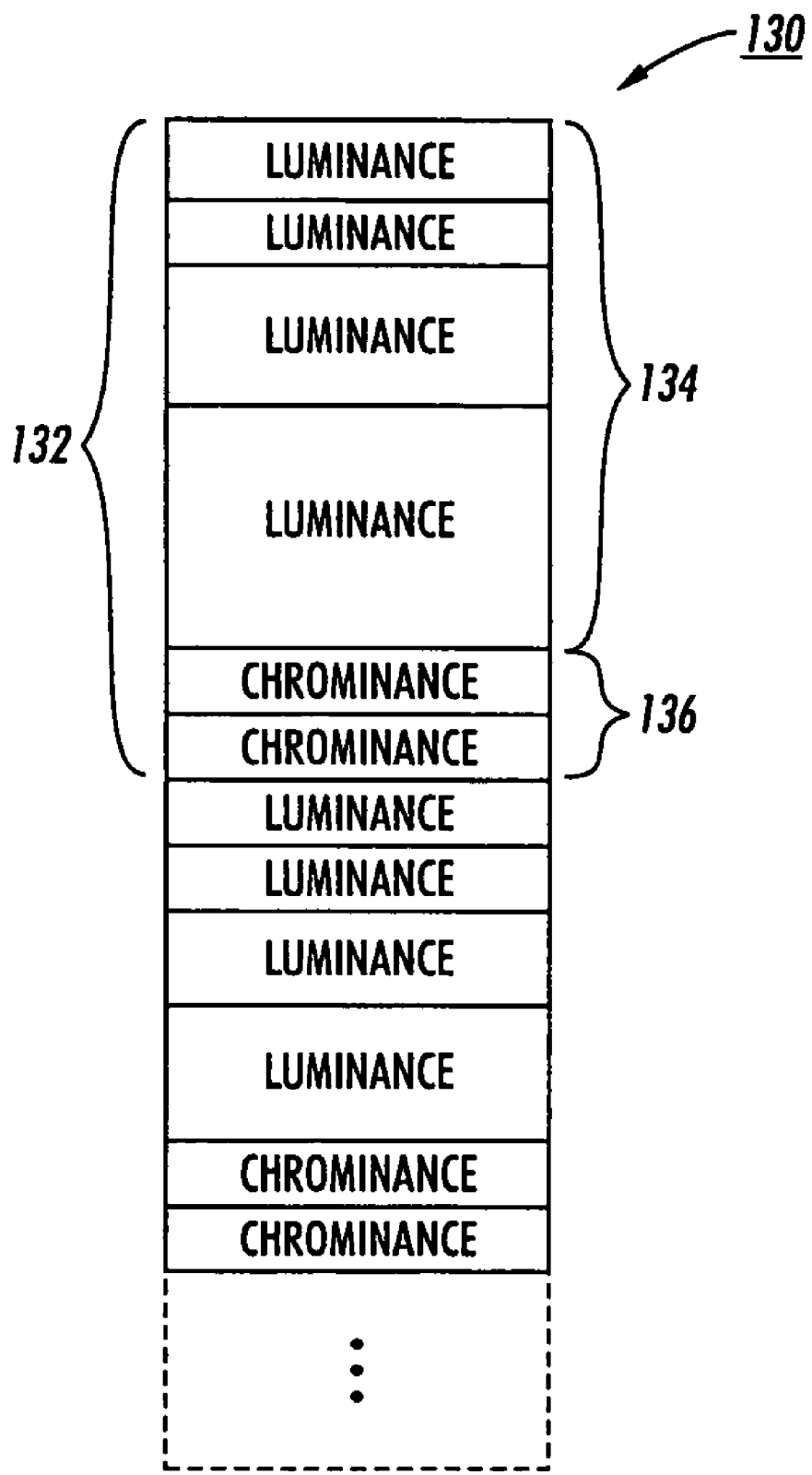
FIG. 3 shows an exemplary luminance and chrominance blocks in JPEG compressed image data.

If the above-discussed 4 to 1 subsampling of chrominance portions of the image data is performed, the compressed image data may include four luminance data blocks for every two chrominance blocks, where the sizes of each of the blocks may vary. Thus, compressed image data 110 may have a block configuration 130 as shown in FIG. 3, where four luminance blocks 134 and two chrominance blocks 136 may be grouped together into a large compressed image data portion 132. This pattern of four luminance blocks and two chrominance blocks may be repeated throughout compressed image data 110. Thus, individual quantized DC coefficients of each luminance block of compressed image data 110 may be extracted by performing a decoding process to obtain a corresponding 8×8 block of outputs 112.

In view of the above, background removal may be performed directly on compressed image data 110 by processing data blocks in compressed image data 110 one block at a time to generate a background removed compressed image data. The process may start at one end of the compressed image data and progress through the compressed image data one block at a time and appending each successive background removed block to prior processed blocks until the complete background removed compressed image data is formed.

Each of the compressed image data blocks may be decoded. If the block is a chrominance block, no processing is performed and the chrominance block is recompressed and output by encoder 108 and appended to the partially formed background removed compressed image data. If the block is a luminance block, the quantized DC coefficient of the luminance block may be converted into a stretched quantized DC coefficient replacing the quantized DC coefficient in the luminance block to form a modified block. Encoder 108 may compress the modified block and append it to the partially formed background removed compressed image data. Since the quantized-stretched DC coefficient may have a different value than the unstretched original quantized DC coefficient, the compressed size of the modified may be different from the original luminance block. Additionally, encoding process of encoder 108 may be sensitive to the byte alignment of certain binary patterns so that compressed data associated with unmodified blocks such as chrominance block may differ from the original. Thus, the size of the background removed compressed image data may be different from the size of the original compressed image data.

Figure 4:
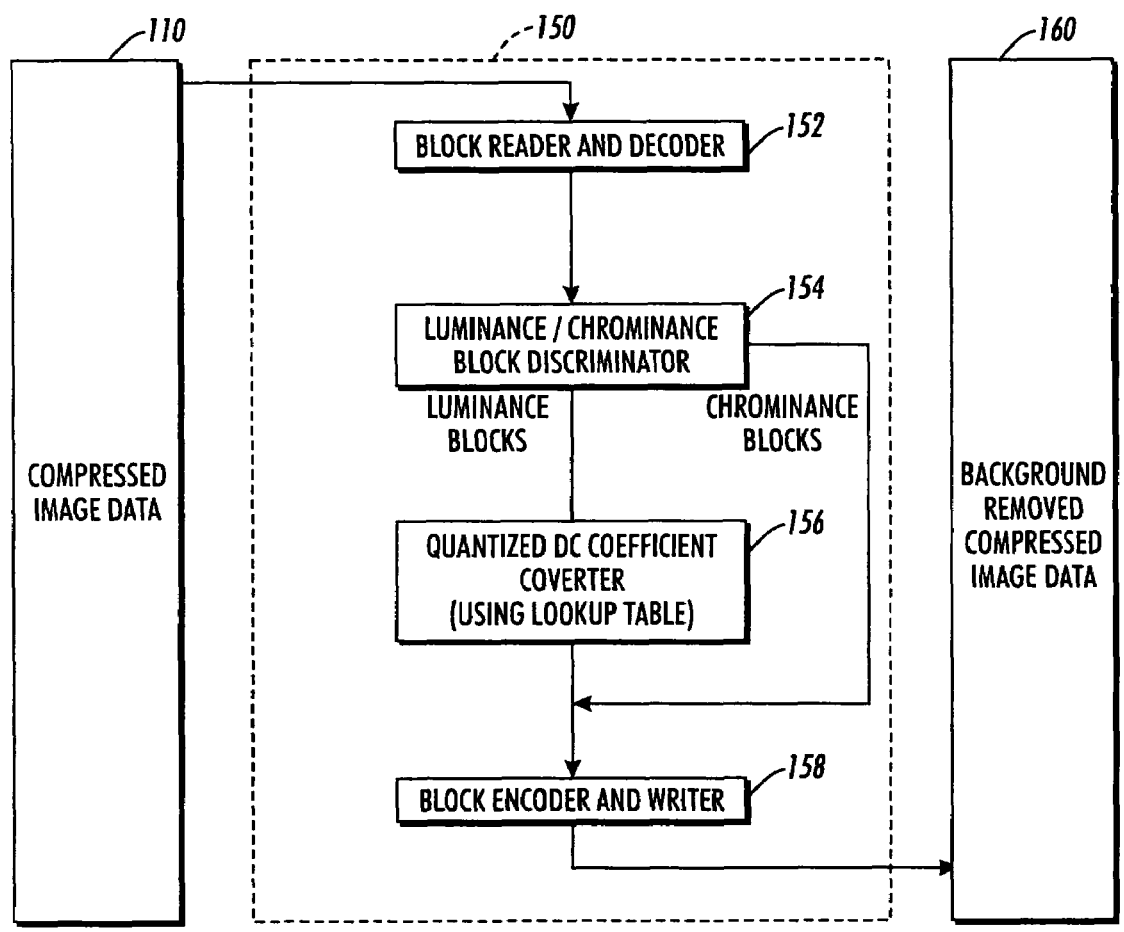
FIG. 4 shows a block diagram of an exemplary process for background removal of JPEG compressed image data.

FIG. 4 shows a block diagram of an exemplary image background remover 150. Inage background remover 150 may include a block reader and decoder 152, a luminance/chrominance block discriminator 154, a quantized DC coefficient converter 156 used only for luminance blocks, and block encoder and writer 158. Luminance block reader and decoder 152 may read each 8×8 block from compressed image data 110 based on the layout of luminance and chrominance blocks as illustrated in FIG. 3, and decodes the block to obtain outputs 112 of quantizer 106, assuming that the process illustrated in FIG. 1 was used to generate the compressed image data. Block reader and decoder 152 outputs 8×8 blocks to luminance/chrominance block discriminator 154 that separates luminance blocks from chrominance blocks. Luminance blocks are sent to quantized DC coefficient converter 156 while chrominance blocks are sent to block encoder and writer 158. Quantized DC coefficient converter 156 converts the quantized DC coefficients into stretched-quantized DC coefficients using a lookup table discussed below.

The stretched-quantized DC coefficient is output to block encoder and writer 158. Block encoder and writer 158 encodes blocks as they arrive and outputs the encoded blocks using predictive, Huffman and/or run-length encoding, for example, to form background removed blocks. The background removed blocks are appended consecutively, for example, to form background removed compressed image data. Thus, blocks of the compressed image data are processed one at a time to perform background removal.

The above-described image background remover 150 may be implemented in hardware using dedicated components to perform functions of each of the components 152, 154 and 158. Such components may be constructed using hardware devices such as FPGA, PLA, PAL, application specific integrated circuits (ASICs), etc. Image background remover 150 may also be implemented in software having programs executing in a general purpose, special purpose processor or other processing machines.

Figure 5:
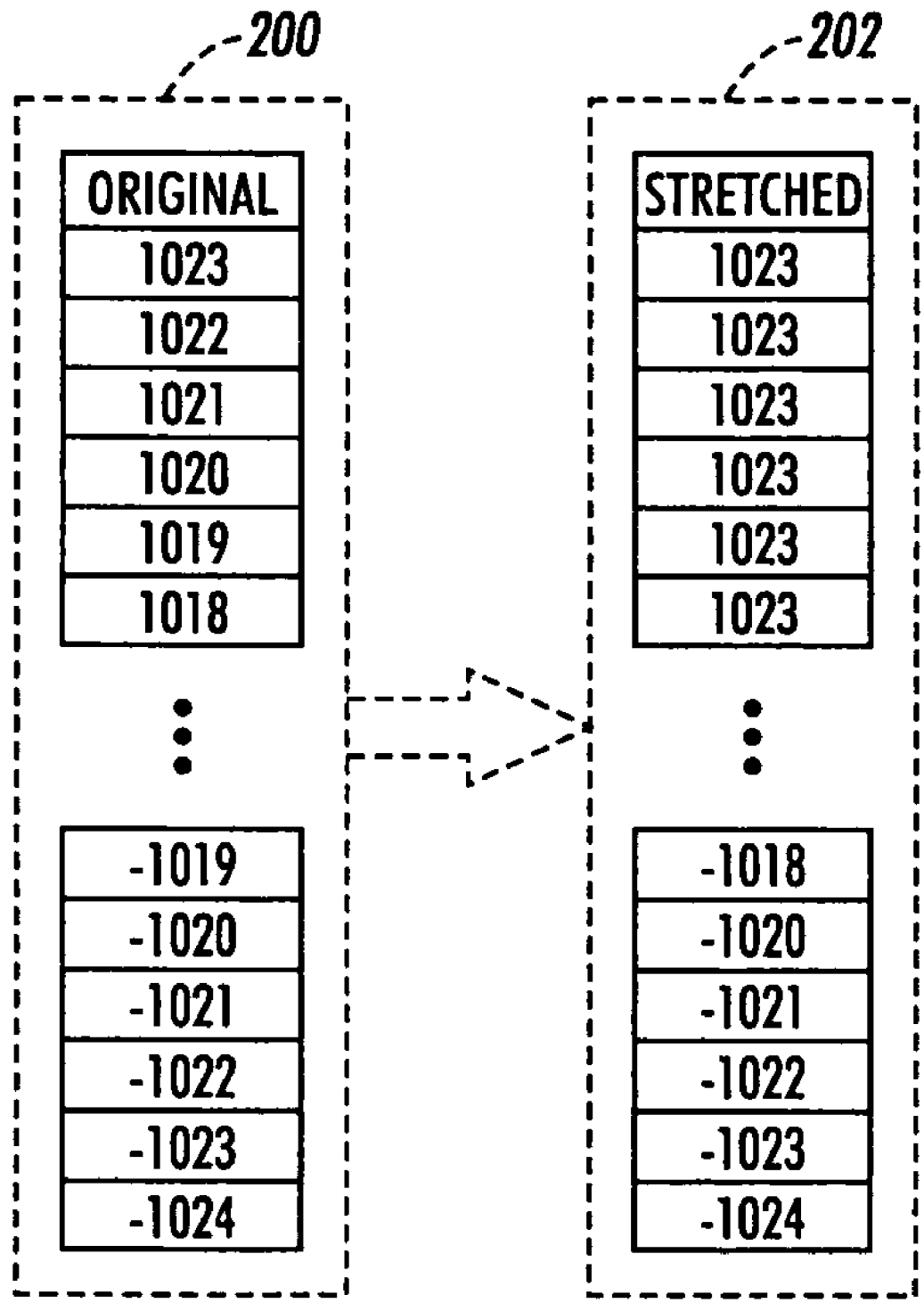
FIG. 5 shows an exemplary lookup table.

FIG. 5 shows an exemplary lookup table 202 for a quantization factor of 1, for simplicity of discussion, that corresponds to a 20% stretch factor for 11 bit quantized DC coefficients, as an example. Column 200 shows possible signed-quantized DC coefficient values ranging from −1024 to 1023. For example, a biased value corresponding to signed-quantized DC coefficient value of −1020 is 4. For a 20% stretch, the value 4 is increased to 4.8. After truncation into an integer value, 4.8 becomes 4 and corresponds to −1020 which is the same as the original value. For signed-quantized DC coefficient value of −1019, the result is −1018 because the biased value is 5, and 20% stretched value for 5 is 6, which when converted to signed-quantized DC coefficient value becomes −1018.

On the upper end shown in FIG. 5, signed-quantized DC coefficients having values 1018 to 1023 correspond to biased values of 2042 to 2047. When stretched by 20%, all of these values exceed a maximum value of 2047. Thus, these values are clamped to 2047 (assuming clamping to a maximum value as the target value), which corresponds to 1023.

The stretch factor may be obtained by assessing the statistical distribution of blur luminance values. For example, the stretch factor may be obtained prior to compression by examining DC coefficients output from DCT 104. However, the stretch factor may be determined post compression by taking statistical samples of all the DC coefficients represented in compressed image data 110, construct a histogram of blurred luminance values and picking a white point. For example, for eight bit values, if the white point has a value of 240 out of 255, then the stretch-and-clamp processor 158 may perform the following equation (1):

$$\text{Stretched } DC = \text{MIN}(255, DC*255/240),$$

where DC is the luminance DC coefficient, 255 is the target luminance value and 255/240 is the stretch factor. The target luminance value may be any desired value, but is set here to the maximum luminance value as an example.

Luminance DC coefficients may be extracted from JPEG compressed image files in a similar manner as discussed above. Samples may be obtained by selecting some or all of the luminance blocks, decoding and dequantizing the blocks to obtain the luminance DC coefficients.

Figure 6:
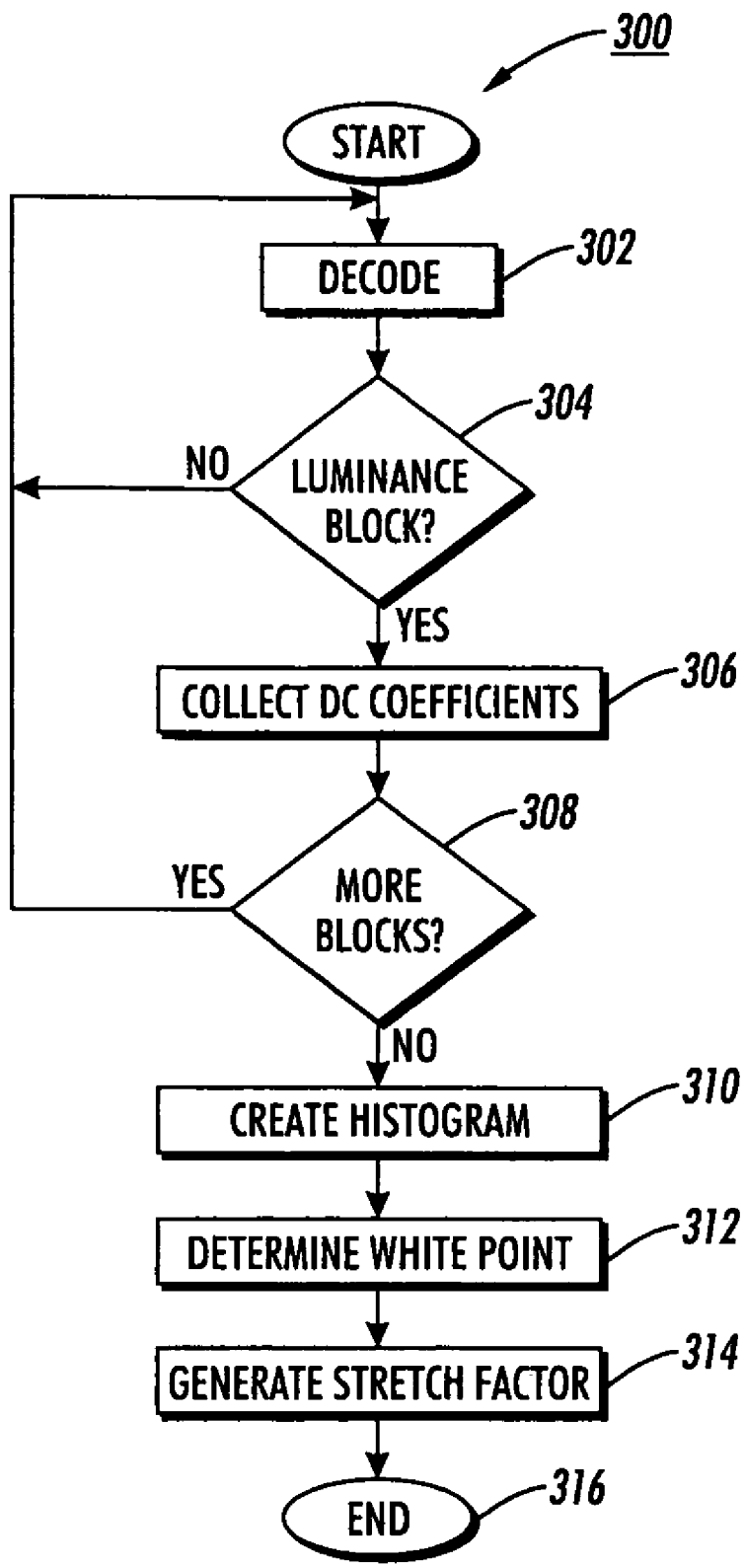
FIG. 6 shows a flowchart of an exemplary process for obtaining a stretch factor.

FIG. 6 shows a flowchart 300 of an exemplary process for generating a stretch factor. In step 302, the process decodes a next block in compressed image data 110 and goes to step 304. In step 304, the process determines whether the decoded block is a luminance block. If the block is a luminance block, the process goes to step 306; otherwise, the process returns to step 302. In step 306, the process collects the DC coefficient based on an algorithm such as a preset sample rate, for example, and goes to step 308. In 308, the process determines whether there are more blocks in compressed image data 110. If there are more blocks, the process returns to step 302; otherwise, the process goes to step 310. In step 310, the process creates a histogram of the collected DC coefficients and goes to step 312. In step 312, the process selects a white point such as the value of the second highest peak in the histogram and goes to step 314. In step 314, the process generates a stretch factor using equation (1) as discussed above and goes to step 316 and ends.

The above described image background remover 150 may be applied to image data represented in many different formats. For example, if image data is represented in mixed raster content (MRC) format, then representative luminance values of each of the layers may be collected to determine a white point and generate the stretch factor. This process may be performed even if each of the layers are JPEG compressed by extracting selected DC coefficients. After the stretch factor has been generated, the luminance DC coefficients may be stretched and replaced into the appropriate locations within each layer. In many instances, satisfactory background removal may be obtained by sampling only the background layer in the MRC format. In this case, only luminance DC coefficients in the background layer may be used to determine the white point. But once the stretch factor is determined, all layers, background or foreground, must be stretched.

N-layer representations may include a color mask layer which has a single color value expressed either in YCC format or RGB format and a layer of mask bits (1s or 0s). If the color is expressed in RGB format, then a conversion to the YCC format may be performed. The number of 1 bits in the mask may be estimated and the Y value of the color mask layer may be weighted using the estimate (or actual count) of the number of 1 bits. This weighted luminance value may be used together with other similar values derived from the other layers to determine a white point and generate a stretch factor for stretching the luminance values of all the layers.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A computer-readable memory storing software instructions for processing compressed image data, the instructions including the steps of:
   decoding compressed image data one block at a time to generate decoded blocks;
   stretching first values of the decoded blocks; and
   encoding decoded blocks with stretched-first values replacing corresponding first values to generate background removed compressed image data.

2. The computer-readable memory of claim 1, the instructions further including the steps of:
   selecting decoded luminance blocks; and
   reading quantized DC coefficients of decoded luminance blocks as the first values.

3. The computer-readable memory of claim 2, the instructions further including the steps of:
   dequantizing the first values to obtain DC coefficients;
   multiplying the DC coefficients by a stretch factor to obtain stretched DC coefficients; and
   quantizing the stretched DC coefficients to obtain a quantized-stretched DC coefficients.

4. The computer-readable memory of claim 3, the instructions further including the steps of:
   replacing the quantized DC coefficients in the decoded luminance blocks with corresponding quantized-stretched DC coefficients to obtain modified luminance blocks;
   encoding the modified luminance blocks to obtain a compressed modified luminance block; and
   outputting the compressed modified luminance blocks together with encoded chrominance blocks to form the background removed compressed image data.

5. The computer-readable memory of claim 3, the instructions further including the steps of:
   combining functions of the dequantizing, multiplying and quantizing steps into a lookup table; and
   obtaining the quantized-stretched DC coefficients based on a quantized DC coefficients using the lookup table.

6. The computer-readable memory of claim 1, the instructions further including the steps of:
   obtaining second values from the compressed image data that correspond to luminance DC coefficients;
   analyzing the second values to generate an analysis result; and
   selecting a white point for the image data based on the analysis result.

7. The computer-readable memory of claim 6 the instructions further including the steps of:
   dividing a white point value into a target luminance value to generate a stretch factor.

8. The computer-readable memory of claim 7, the instructions further including the steps of:
   obtaining the first and the second luminance DC coefficient values from a background layer and/or a foreground of an MRC format data, or from one or more layers of an N-layer format data or a luminance value from a color layer;
   generating stretched values based on the second values and the stretch factor; and
   replacing each of the first values in the background layer and/or foreground layer, or the layers of the N-layer format data with a corresponding one of the stretched values.

9. The computer-readable memory of claim 6, the instructions further including the steps of:
   selecting a number of the second values to be less than a number of the first values;
   setting the target luminance value to be a maximum luminance value; and
   generating a histogram for analyzing the second values.

10. The computer-readable memory of claim 1, wherein the compressed image data is processed by a xerographic apparatus.

11. An apparatus that processes compressed image data, comprising:
    a processor and a computer-readable memory, the computer-readable memory containing instructions instructing the apparatus to:
    locate first values corresponding to luminance in the compressed image data;
    read the first values;
    select a compressed luminance block in the compressed image data;
    decode the compressed luminance block into quantized luminance coefficients;
    convert a quantized DC coefficient of the quantized luminance coefficients to a quantized-stretched DC coefficient;
    replace the quantized DC coefficient in the quantized luminance coefficients with the quantized-stretched DC coefficient to obtain modified quantized-luminance coefficient blocks; and
    encode the modified quantized-luminance coefficient blocks to obtain compressed modified luminance blocks.

* * * * *